(12) United States Patent
Zhang et al.

(10) Patent No.: US 12,238,142 B2
(45) Date of Patent: Feb. 25, 2025

(54) METHOD AND APPARATUS FOR CONTROLLING NETWORK SERVICE OF INTERNET OF THINGS TERMINAL, AND STORAGE MEDIUM

(71) Applicant: HUAWEI TECHNOLOGIES CO., LTD., Guangdong (CN)

(72) Inventors: Yinxi Zhang, Nanjing (CN); Bin Yu, Nanjing (CN); Liang Xia, Shenzhen (CN); Yinggen Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 235 days.

(21) Appl. No.: 17/883,800

(22) Filed: Aug. 9, 2022

(65) Prior Publication Data
US 2022/0385698 A1  Dec. 1, 2022

Related U.S. Application Data

(63) Continuation of application No. PCT/CN2020/115661, filed on Sep. 16, 2020.

(30) Foreign Application Priority Data

Feb. 10, 2020 (CN) .......................... 202010085286.3
Jun. 5, 2020 (CN) .......................... 202010507405.X

(51) Int. Cl.
*H04L 9/40* (2022.01)
(52) U.S. Cl.
CPC .............. *H04L 63/20* (2013.01); *H04L 63/08* (2013.01)

(58) Field of Classification Search
None
See application file for complete search history.

(56) References Cited

U.S. PATENT DOCUMENTS

2005/0038690 A1   2/2005  Hayes-Roth
2018/0316563 A1*  11/2018 Kumar ................ H04W 12/102
(Continued)

FOREIGN PATENT DOCUMENTS

| CN | 110770695 A | 2/2020 |
| WO | 2018232111 A1 | 12/2018 |
| WO | 2019033116 A1 | 2/2019 |

OTHER PUBLICATIONS

IETF RFC8520, E. Lear et al., Manufacturer Usage Description Specification, Internet Engineering Task Force (IETF), Request for Comments: 8520, Mar. 31, 2019, total 60 pages.
(Continued)

*Primary Examiner* — Brandon Hoffman

(57) ABSTRACT

A method and an apparatus for controlling a network service of an Internet of things terminal, and a related storage medium are disclosed. In the method, after receiving a uniform resource locator (URL) sent by an Internet of things terminal in an authentication process, a network management device obtains a manufacturer usage descriptions (MUD) file based on the URL, and parses the MUD file to obtain content of at least one field included in the MUD file, where the MUD file includes at least one of: a first-type field or a second-type field, the first-type field is used to describe a security isolation requirement, and the second-type field is used to describe a quality assurance requirement.

18 Claims, 4 Drawing Sheets

(56) References Cited

U.S. PATENT DOCUMENTS

| | | | |
|---|---|---|---|
| 2018/0316673 A1 | 11/2018 | Shah et al. | |
| 2019/0110298 A1 | 4/2019 | Lear et al. | |
| 2019/0253319 A1 | 8/2019 | Kampanakis et al. | |
| 2019/0260751 A1 | 8/2019 | Kale et al. | |
| 2019/0319953 A1* | 10/2019 | Lear | H04L 9/3263 |
| 2020/0177485 A1* | 6/2020 | Shurtleff | H04L 41/142 |

OTHER PUBLICATIONS

E. Lear et al., Bandwidth Profiling Extensions for MUD, Network Working Group, Internet-Draft, draft-lear-opsawg-mud-bw-profile-01, Jul. 8, 2019, total 11 pages.

Office Action issued in CN202010507405.X, dated May 7, 2022, 9 pages.

International Search Report and Written Opinion issued in PCT/CN2020/115661, dated Dec. 16, 2020, 8 pages.

"SEG 8—Communication Technologies and Architectures of Electrotechnical Systems Monitoring and impact assessment of emerging technologies and architectures (Draft 1830.121.2018) Table of contents", IEEE Draft; SEG8-WG1-53R1 IEC_SEG8_DELIVERABLE2-2018-12-18, IEEE-SA, Piscataway, NJ USA vol. 802.24 Mar. 11, 2019 (Mar. 11, 2019), pp. 1-93, XP068174510, total 93 pages.

Lear Cisco Systems R Droms Google D Romascanu E: "Manufacturer Usage Description Specification; rfc8520.txt", Manufacturer Usage Description Specification; RFC8520.TXT, Internet Engineering Task Force, IETF; Standard, Internet Society (ISOC) 4, Rue Des Falaises CH-1205 Geneva, Switzerland, Mar. 13, 2019 (Mar. 13, 2019), pp. 1-60, XP015130695, total 60 pages.

Extended European Search Report issued in EP20918960.4 dated Jun. 9, 2023, 11 pages.

Office Action issued in JP2022-548410, dated Jan. 9, 2024 with English translation, 15 pages.

Notice of Allowance issued in CN202010507405.X, dated Sep. 7, 2022, 5 pages.

Office Action issued in JP2022-548410, dated Jul. 10, 2024 with English translation, 6 pages.

* cited by examiner

METHOD AND APPARATUS FOR CONTROLLING NETWORK SERVICE OF INTERNET OF THINGS TERMINAL, AND STORAGE MEDIUM

CROSS-REFERENCE TO RELATED APPLICATIONS

This application is a continuation of International Application No. PCT/CN2020/115661, filed on Sep. 16, 2020, which claims priority to Chinese Patent Application No. 202010085286.3, filed on Feb. 10, 2020, and Chinese Patent Application No. 202010507405.X, filed on Jun. 5, 2020. The afore-mentioned patent applications are hereby incorporated by reference in their entireties.

TECHNICAL FIELD

This application relates to the field of communications technologies, and in particular, to a method and an apparatus for controlling a network service of an Internet of things terminal, and a storage medium.

BACKGROUND

With transformation of enterprises toward digitalization and intelligence, increasingly more Internet of things (IoT) terminals appear in an enterprise campus, including a printer, a camera, a light emitting diode (LED) lamp, a projector in a conference room, a conference terminal, and the like. A requirement of the enterprise on a campus network also changes from access of only an office system (such as a notebook computer and a desktop computer) to access of both the office system and various Internet of things terminals.

A set of processes for cooperation between a manufacturer of the Internet of things terminal and the campus network is defined in the Internet engineering task force (IETF) request for comments (RFC) 8520 standard. The IETF RFC 8520 standard focuses on a manufacturer usage descriptions (MUD) file, to identify manufacturer information of the Internet of things terminal and an access permission requirement of the Internet of things terminal. All manufacturers define respective MUD files based on a requirement of the Internet of things terminal. A uniform resource locator (URL) used to indicate a network storage location of the MUD file is transmitted to a controller in the campus network by using an authentication process of the Internet of things terminal. The controller obtains, based on the URL, a related MUD file from a MUD file server to which the URL points, and then completes, based on the MUD file, automatic mapping from access permission of the Internet of things terminal to a network policy.

SUMMARY

This application provides a method and an apparatus for controlling a network service of a related Internet of things terminal, and a related storage medium, to reduce enterprise operating costs.

According to a first aspect, a method for controlling a network service of an Internet of things terminal is provided. In this method, after receiving a URL sent by an Internet of things terminal in an authentication process, a network management device obtains a MUD file based on the URL, and parses the MUD file to obtain content of at least one field included in the MUD file. Then, the network management device generates a policy based on the content that is of the at least one field and that is obtained through parsing, where the policy is used to control a network service of the Internet of things terminal, to implement a requirement described in the content of the at least one field.

The MUD file is used to describe an abstract communication intent of the Internet of things terminal. To be specific, the MUD file is used to send a signal for the Internet of things terminal to a campus network, to indicate specified network configuration in which a function required by the Internet of things terminal can be normally operated. The MUD file includes at least one of: a first-type field or a second-type field.

The first-type field is used to describe a security isolation requirement, and the first-type field includes at least one field. To be specific, the first-type field includes some information related to the security isolation requirement of the Internet of things terminal. Optionally, the first-type field includes at least one of the following fields: a user control list group field, an isolated field, or the like.

The user control list group field is used to indicate a user group or a security group. A network between the user group and the security group is disconnected. Whether Internet of things terminals in a same user group can communicate with each other depends on whether the user group is an interworking group or an isolated group. Whether Internet of things terminals in a same security group can communicate with each other depends on whether the security group is an interworking group or an isolated group. Internet of things terminals in the interworking group can communicate with each other, and Internet of things terminals in the isolated group cannot communicate with each other.

The isolated field is used to indicate whether isolation is required. To be specific, the isolated field indicates whether the user group or the security group that is indicated by the user control list group field is an interworking group or an isolated group. If the isolated field indicates that isolation is not required, it indicates that the user group or the security group that is indicated by the user control list group field is an interworking group. In this case, Internet of things terminals in the user group or the security group that is indicated by the user control list group field can communicate with each other. If the isolated field indicates that isolation is required, it indicates that the user group or the security group that is indicated by the user control list group field is an isolated group. In this case, Internet of things terminals in the user group or the security group that is indicated by the user control list group field cannot communicate with each other.

The second-type field is used to describe a quality assurance requirement, and the second-type field includes at least one field. To be specific, the second-type field includes some information related to the quality assurance requirement of the Internet of things terminal. Optionally, the second-type field includes at least one of the following fields: a bandwidth field, a delay field, a jitter field, a priority field, or the like.

The bandwidth field is used to indicate an uplink/downlink bandwidth requirement, and includes a bandwidth required by traffic initiated from the Internet of things terminal and a bandwidth required by traffic sent to the Internet of things terminal. The delay field is used to indicate an uplink/downlink delay requirement, and includes a delay that needs to be met by traffic initiated from the Internet of things terminal and a delay that needs to be met by traffic sent to the Internet of things terminal. The jitter field is used to indicate an uplink/downlink latency jitter requirement, and includes a latency jitter that needs to be met by traffic initiated from the Internet of things terminal and a latency jitter that needs to be met by traffic sent to the Internet of things terminal. The priority field is used to indicate at least one of an Internet protocol (IP) layer priority, an Ethernet layer priority, or the like.

Optionally, the MUD file further includes a third-type field, and the third-type field is used to describe an access permission requirement. To be specific, the third-type field includes some information related to the access permission requirement of the Internet of things terminal. Optionally, the third-type field includes an accessible server, a domain name, and the like, and further includes an access control list (ACL) and the like.

In this embodiment of this application, after receiving the URL sent by the Internet of things terminal in the authentication process, the network management device obtains the MUD file based on the URL. Next, the network management device synchronizes information with the Internet of things terminal in at least one of a network security isolation dimension, a network quality assurance dimension, or a network access permission dimension based on the MUD file. Then, the network management device generates, based on the content of the MUD file, the policy that is used to control the network service of the Internet of things terminal. In this way, deployment of the Internet of things terminal in terms of at least one of security isolation, quality assurance, or access permission can be automatically completed, so that enterprise operating costs are reduced.

Optionally, after generating the policy, the network management device sends the policy to an access device of the Internet of things terminal. After receiving the policy, the access device performs corresponding network configuration (including but not limited to interface configuration, protocol configuration, and service configuration) based on the policy. After completing the corresponding network configuration, the access device notifies the Internet of things terminal that authentication succeeds. Then, the access device can control, based on the network configuration, the network service of the Internet of things terminal that has accessed the campus network, to meet a service requirement of the Internet of things terminal.

According to a second aspect, an apparatus for controlling a network service of an Internet of things terminal is provided, where the apparatus for controlling a network service of an Internet of things terminal has a function of implementing a behavior in the method for controlling a network service of an Internet of things terminal in the first aspect. The apparatus for controlling a network service of an Internet of things terminal includes at least one module, and the at least one module is configured to implement the method for controlling a network service of an Internet of things terminal provided in the first aspect.

According to a third aspect, an apparatus for controlling a network service of an Internet of things terminal is provided. A structure of the apparatus for controlling a network service of an Internet of things terminal includes a processor and a memory. The memory is configured to: store a program supporting the apparatus for controlling a network service of an Internet of things terminal in performing the method for controlling a network service of an Internet of things terminal provided in the first aspect, and store data that is used to implement the method for controlling a network service of an Internet of things terminal according to the first aspect. The processor is configured to execute the program stored in the memory. Optionally, the apparatus for controlling a network service of an Internet of things terminal further includes a communications bus, and the communications bus is configured to establish a connection between the processor and the memory.

According to a fourth aspect, a computer-readable storage medium is provided. The computer-readable storage medium stores instructions, and when the instructions are run on a computer, the computer is enabled to perform the method for controlling a network service of an Internet of things terminal according to the first aspect.

According to a fifth aspect, a computer program product including instructions is provided. When the computer program product is run on a computer, the computer is enabled to perform the method for controlling a network service of an Internet of things terminal according to the first aspect.

According to a sixth aspect, a computer-readable storage medium that stores data is provided. The data includes a data structure. The data structure includes at least one of: a first-type field or a second-type field, the first-type field is used to describe a security isolation requirement, the second-type field is used to describe a quality assurance requirement, and the first-type field and the second-type field each include at least one field.

According to a seventh aspect, a data structure of a MUD file is provided. The MUD file is used to describe a network requirement of an Internet of things terminal. The data structure includes at least one of: a first-type field or a second-type field, the first-type field is used to describe a security isolation requirement, the second-type field is used to describe a quality assurance requirement, and the first-type field and the second-type field each include at least one field.

Technical effects achieved in the second aspect, the third aspect, the fourth aspect, the fifth aspect, the sixth aspect, and the seventh aspect are similar to technical effects achieved by using corresponding technical means in the first aspect.

DESCRIPTION OF EMBODIMENTS

Figure 1:
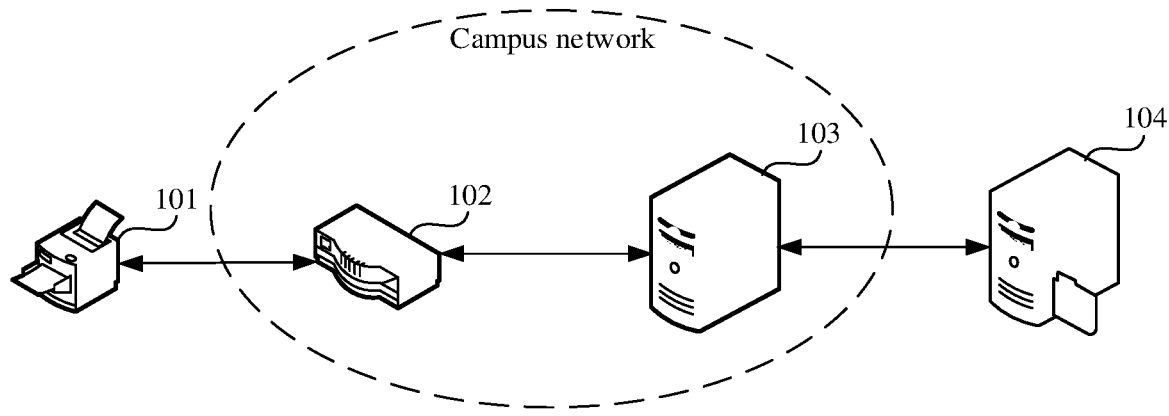
FIG. 1 is a schematic diagram of an implementation environment according to an embodiment of this application.

To make the objectives, technical solutions, and advantages of this application clearer, the following further describes implementations of this application in detail with reference to the accompanying drawings.

It should be understood that "a plurality of" mentioned in embodiments of this application means two or more. In the descriptions of the embodiments of this application, "/" means "or" unless otherwise specified. For example, A/B may represent A or B. In this specification, "and/or" describes only an association relationship of associated objects and represents that three relationships may exist. For example, A and/or B may represent the following three cases: Only A exists, both A and B exist, and only B exists. In addition, for convenience of clear description of the technical solutions in the embodiments of this application, terms such as "first" and "second" are used to distinguish between same objects or similar objects whose functions and purposes are basically the same. A person skilled in the art understands that the terms such as "first" and "second" are not intended to limit a quantity or an execution sequence, and the terms such as "first" and "second" do not indicate a definite difference.

Before the embodiments of this application are described in detail, application scenarios in the embodiments of this application are described first.

With transformation of enterprises toward digitalization and intelligence, increasingly more Internet of things terminals appear in an enterprise campus, including a printer, a camera, an LED lamp, a projected screen in a conference room, a conference terminal, and the like. A requirement of the enterprise on a campus network also changes from access of only an office system (such as a notebook computer and a desktop computer) to access of both the office system and various Internet of things terminals.

With deeper transformation of the enterprises toward digitalization and intelligence, a quantity of Internet of things terminals that access the campus network further increases. This puts forward a higher requirement on the campus network. In addition to requirements in conventional dimensions such as an access port and an access bandwidth, the Internet of things terminal may have higher security and quality requirements. For example, a video surveillance system usually has a security isolation requirement, and expects a network system of the video surveillance system to be securely isolated from an ordinary campus network, that is, does not allow an ordinary employee who accesses the campus network to access a camera in the video surveillance system. For another example, a conference terminal usually expects to obtain a reliable priority assurance and a reliable bandwidth assurance from the campus network.

A requirement of the Internet of things terminal on the campus network, such as an access permission requirement, a security isolation requirement, or a quality assurance requirement, inevitably causes complexity of management and maintenance of the campus network. A network administrator may know that some Internet of things terminals have related requirements, but does not know specific requirements, for example, a specific uplink/downlink bandwidth required by the conference terminal, and whether the Internet of things terminal needs to be isolated. However, generally, a manufacturer of the Internet of things terminals is well aware of the related requirements. For example, the manufacturer knows the specific uplink/downlink bandwidth, a specific priority assurance, a specific delay assurance, and the like that are required by the conference terminal. However, currently, there is no method to map the requirement information to the campus network.

Therefore, the embodiments of this application provide a method for controlling a network service of an Internet of things terminal, to obtain a MUD file that includes requirement information of the Internet of things terminal, and then generate a policy that matches the requirement information, so as to control the network service of the Internet of things terminal. In this way, automatic deployment of a related requirement of the Internet of things terminal in the campus network can be completed.

An implementation environment in the embodiments of this application is described below.

FIG. 1 is a schematic diagram of an implementation environment according to an embodiment of this application. Refer to FIG. 1. The method for controlling a network service of an Internet of things terminal provided in the embodiments of this application is applied to various networks based on the transmission control protocol/Internet protocol (TCP/IP), for example, a campus network. The implementation environment of the method includes an Internet of things terminal 101, an access device 102, a network management device 103, and a MUD file server 104.

The access device 102 and the network management device 103 are in the campus network. The Internet of things terminal 101 accesses the campus network by using the access device 102. The Internet of things terminal 101 communicates with the access device 102 by using a wired connection or a wireless connection. The access device 102 communicates with the network management device 103 by using a wired connection or a wireless connection. The network management device 103 communicates with the MUD file server 104 by using a wired connection or a wireless connection.

The Internet of things terminal 101 includes but is not limited to a printer, a camera, an LED lamp, a projected screen in a conference room, and a conference terminal. The Internet of things terminal 101 needs to access the campus network to use a service provided by the campus network. The Internet of things terminal 101 needs to initiate authentication when accessing the campus network.

The access device 102 provides the Internet of things terminal 101 with a port for accessing the campus network. Optionally, the port is a physical port. Alternatively, the port is a logical port. The access device 102 acts as an agent between the Internet of things terminal 101 and the network management device 103. The Internet of things terminal 101 initiates authentication to the network management device 103 by using the access device 102. The Internet of things terminal 101 transmits a URL of a MUD file to the network management device 103 in an authentication process.

Optionally, the network management device 103 is a MUD controller or an authentication, authorization and accounting (AAA) server. Optionally, the AAA server is a remote authentication dial-in user service (RADIUS) server, a terminal access controller access control system (TACACS), and the like. The network management device 103 verifies an identity of the Internet of things terminal 101 to determine whether the Internet of things terminal 101 is authorized to use the service provided by the campus network. In the authentication process of the Internet of things terminal 101, the network management device 103 obtains the related MUD file from the MUD file server 104 to which the URL of the MUD file points. After authentication of the Internet of things terminal 101 succeeds, the network management device 103 feeds back an authentication success message to the Internet of things terminal 101 by using the access device 102.

The access device 102 and the network management device 103 may be distributed on two different physical entities, or may be integrated into one physical entity. When the access device 102 and the network management device 103 are integrated into one physical entity, the physical entity independently completes authentication of the Internet of things terminal 101.

The MUD file server 104 is a server configured to store the MUD file. A manufacturer of the Internet of things terminal 101 defines the MUD file of the Internet of things terminal 101 in advance based on a network requirement of the Internet of things terminal 101, and stores the MUD file in the MUD file server 104.

The method for controlling a network service of an Internet of things terminal provided in the embodiments of this application is described below.

Figure 2:
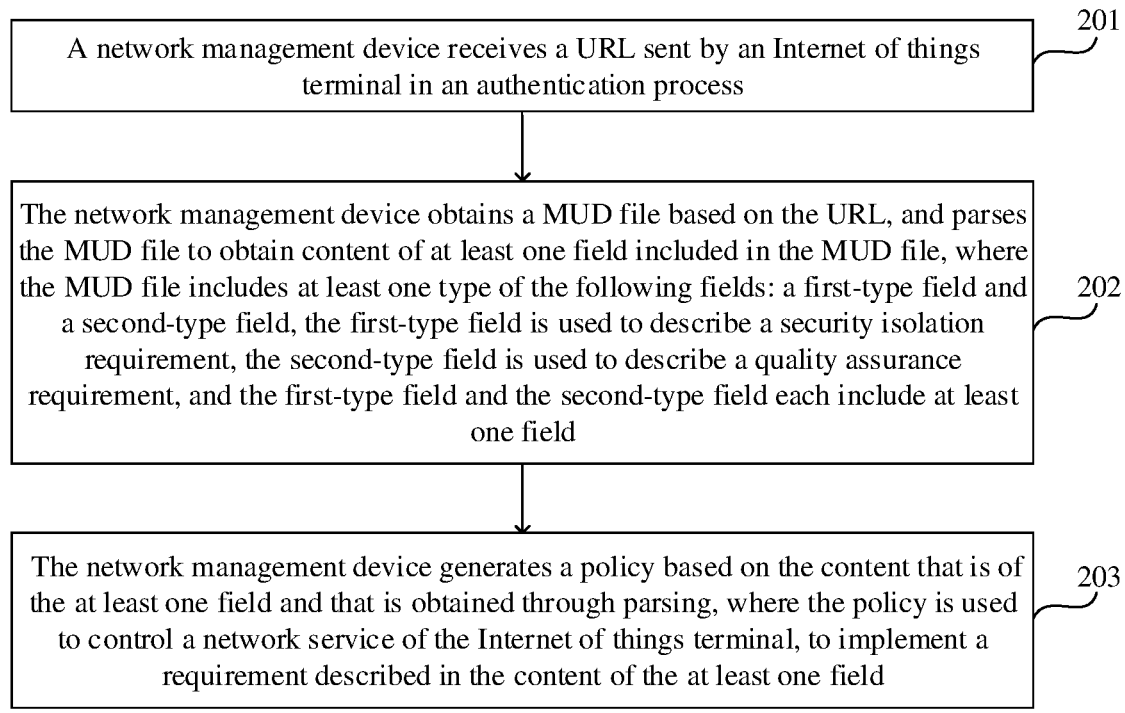
FIG. 2 is a flowchart of a method for controlling a network service of an Internet of things terminal according to an embodiment of this application.

FIG. 2 is a flowchart of a method for controlling a network service of an Internet of things terminal according to an embodiment of this application. The method is applied to the implementation environment shown in FIG. 1. As shown in FIG. 2, the method includes steps 201 to 203.

Step 201. A network management device receives a URL sent by an Internet of things terminal in an authentication process.

Optionally, the network management device is in a campus network. To access the campus network, the Internet of things terminal needs to initiate authentication to the network management device. The Internet of things terminal stores the URL in advance, and the Internet of things terminal transmits the URL to the network management device in the authentication process.

The URL is a network storage location of a MUD file. To be specific, the URL points to a MUD file server that stores the MUD file, and the MUD file is obtained from the MUD file server based on the URL.

In a possible implementation, when the Internet of things terminal needs to access the campus network, the Internet of things terminal initiates authentication to an access device in the campus network. A protocol packet sent by the Internet of things terminal to the access device in the authentication process carries the URL. When receiving the protocol packet that carries the URL and that is sent by the Internet of things terminal, the access device sends an authentication packet to the network management device. The authentication packet carries the URL.

Optionally, authentication initiated by the Internet of things terminal is 802.1X authentication, media access control (MAC) authentication, portal authentication, or the like. Different protocol packets are used in all types of authentication. For example, an extensible authentication protocol (EAP) packet is used in 802.1X authentication, and a dynamic host configuration protocol (DHCP) packet is used in MAC authentication.

The authentication packet sent by the access device to the network management device is used to request to perform authentication on the Internet of things terminal. For example, the authentication packet is a RADIUS packet.

Step 202. The network management device obtains the MUD file based on the URL, and parses the MUD file to obtain content of at least one field included in the MUD file, where the MUD file includes at least one of: a first-type field or a second-type field, the first-type field is used to describe a security isolation requirement, the second-type field is used to describe a quality assurance requirement, and the first-type field and the second-type field each include at least one field.

In a possible implementation, the network management device obtains, based on the URL, the MUD file from the MUD file server to which the URL points. Optionally, the network management device obtains the MUD file from the MUD file server based on the URL and by using a hypertext transfer protocol secure (HTTPS).

The MUD file is used to describe an abstract communication intent of the Internet of things terminal. To be specific, the MUD file is used to send a signal for the Internet of things terminal to a campus network, to indicate specified network configuration in which a function required by the Internet of things terminal can be normally operated.

The first-type field includes some information related to the security isolation requirement of the Internet of things terminal. Optionally, the first-type field includes at least one of: a user control list group (UCL-Group) field, an isolated field, or the like.

The UCL-Group field is used to indicate a user group or a security group. A network between the user group and the security group is disconnected. Whether Internet of things terminals in a same user group can communicate with each other depends on whether the user group is an interworking group or an isolated group. Whether Internet of things terminals in a same security group can communicate with each other depends on whether the security group is an interworking group or an isolated group. Internet of things terminals in the interworking group can communicate with each other, and Internet of things terminals in the isolated group cannot communicate with each other.

The isolated field is used to indicate whether isolation is required. To be specific, the isolated field indicates whether the user group or the security group that is indicated by the UCL-Group field is an interworking group or an isolated group. If the isolated field indicates that isolation is not required, it indicates that the user group or the security group that is indicated by the UCL-Group field is an interworking group. In this case, Internet of things terminals in the user group or the security group that is indicated by the UCL-Group field can communicate with each other. If the isolated field indicates that isolation is required, it indicates that the user group or the security group that is indicated by the UCL-Group field is an isolated group. In this case, Internet of things terminals in the user group or the security group that is indicated by the UCL-Group field cannot communicate with each other.

The second-type field includes some information related to the quality assurance requirement of the Internet of things terminal. Optionally, the second-type field includes at least one of: a bandwidth field, a delay (Timedelay) field, a jitterfield, a priority field, or the like.

The Bandwidth field is used to indicate an uplink/downlink bandwidth requirement, and includes a bandwidth required by traffic initiated from the Internet of things terminal and a bandwidth required by traffic sent to the Internet of things terminal.

The Timedelay field is used to indicate an uplink/downlink delay requirement, and includes a delay that needs to be met by traffic initiated from the Internet of things terminal and a delay that needs to be met by traffic sent to the Internet of things terminal.

The Jitter field is used to indicate an uplink/downlink latency jitter requirement, and includes a latency jitter that needs to be met by traffic initiated from the Internet of things terminal and a latency jitter that needs to be met by traffic sent to the Internet of things terminal.

The Priority field is used to indicate at least one of an IP layer priority, an Ethernet layer priority, or the like. Optionally, a Priority field used to indicate the IP layer priority is a differentiated services code point (DSCP) field. A Priority field used to indicate the Ethernet layer priority is an 802.1p field.

For example, the MUD file is defined by a manufacturer based on the requirement of the Internet of things terminal, and is stored by the manufacturer in the MUD file server. For example, considering a real-time requirement of a video conference, a manufacturer of a video conference terminal defines the Timedelay field as 30 milliseconds. Considering a private network isolation requirement of video surveillance, a manufacturer of a video surveillance camera defines the isolated field as True.

In a possible implementation, the first-type field and the second-type field that are included in the MUD file are shown in the following Table 1:

TABLE 1

| Field | Descriptions | Remarks |
| --- | --- | --- |
| Bandwidth (From uplink/To downlink) | Uplink/downlink bandwidth requirement | From: traffic initiated from an Internet of things terminal To: traffic sent to the Internet of things terminal |
| Timedelay (From uplink/To downlink) | Uplink/downlink delay requirement | |
| Jitter (From uplink/To downlink) | Uplink/downlink latency jitter requirement | |
| DSCP | IP layer priority | |
| 802.1p | Ethernet layer priority | |
| UCL-Group | User group/ security group | |
| Isolated | Whether isolation is required | |

It should be noted that, in this embodiment, the first-type field and the second-type field that are included in the MUD file are described only by using Table 1 as an example, and Table 1 does not constitute a limitation on this embodiment.

In a possible implementation, the MUD file includes the first-type field and the second-type field, and further includes a third-type field. The third-type field is used to describe an access permission requirement. To be specific, the third-type field includes some information related to the access permission requirement of the Internet of things terminal. For example, the third-type field includes an accessible server, a domain name, and the like, and further includes an ACL and the like. The ACL is used to control a packet. Specifically, if a rule that is in the ACL and whose action is "permit" is obtained through matching for the packet, the packet is allowed to be forwarded. If a rule that is in the ACL and whose action is "deny" is obtained through matching for the packet, the packet is discarded.

Further, the MUD file further contains some basic information in addition to the requirement information. Optionally, the basic information includes manufacturer information, an Internet of things terminal type, a MUD file server address, and the like, and is used to indicate a specific Internet of things terminal that is manufactured by a specific manufacturer and to which the MUD file is related. Optionally, the basic information further includes a file validity time and the like.

Figure 3:
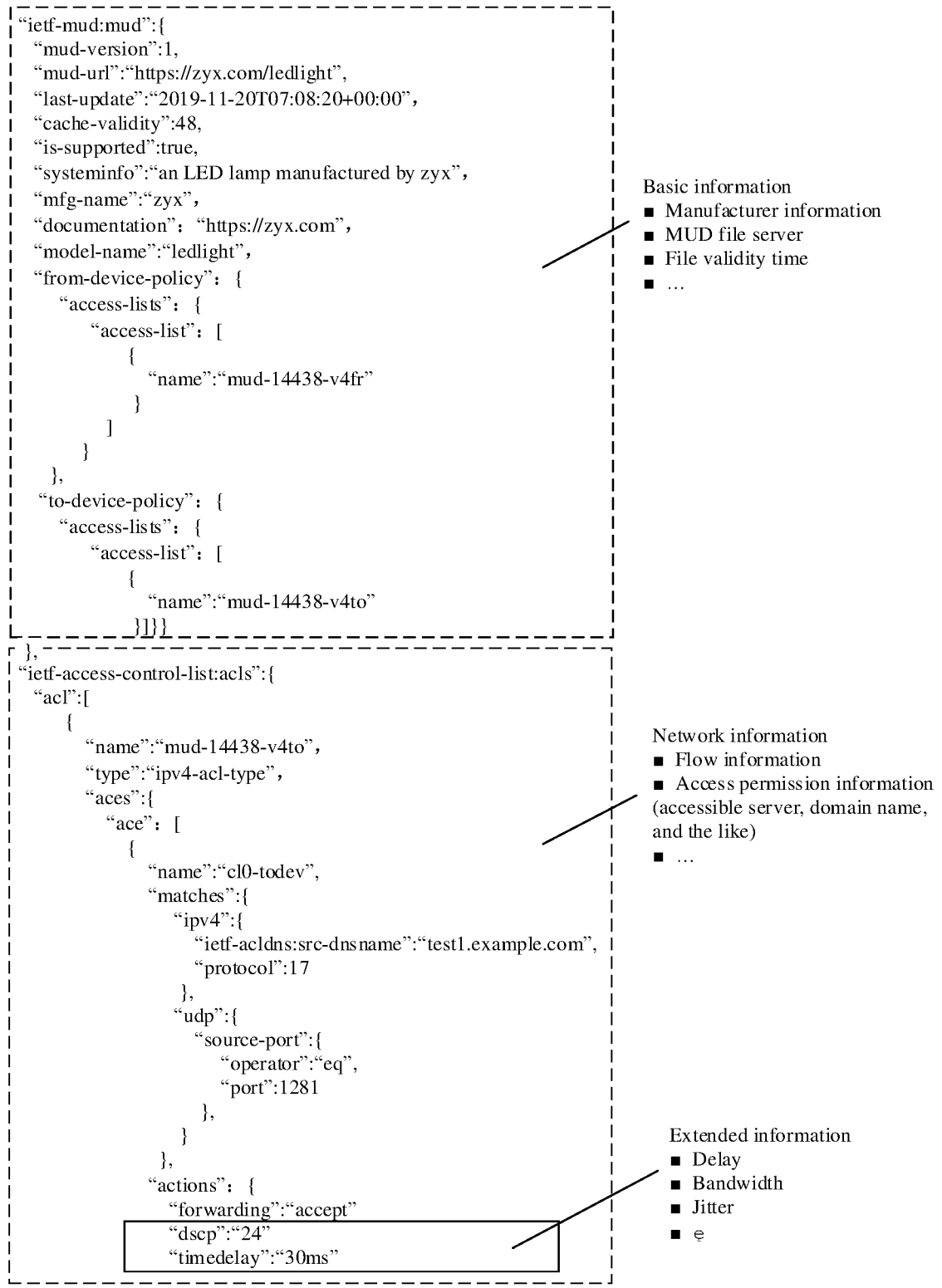
FIG. 3 is a schematic diagram of a data structure of a MUD file according to an embodiment of this application.

The MUD file provided in this embodiment is described below with reference to FIG. 3. FIG. 3 is a schematic diagram of a data structure of a MUD file according to an embodiment of this application. Alternatively, another data structure is used for the MUD file, provided that the MUD file contains the first-type field and the second-type field.

As shown in FIG. 3, the MUD file includes a first-type field, a second-type field, and a third-type field. Content of the first-type field, the second-type field and the third-type field is content shown in a lower dashed-line box in FIG. 3. The content shown in the lower dashed-line box in FIG. 3 includes network information and extended information shown in a solid-line box in FIG. 3. For example, the network information includes flow information and the content of the third-type field, and the content of the third-type field is access permission information such as an accessible server and a domain name. The extended information includes the content of the first-type field and the second-type field, to be specific, security isolation information and quality assurance information such as a delay, a bandwidth, and a jitter.

In addition, the MUD file further includes basic information. The basic information is content shown in an upper dashed-line box in FIG. 3. For example, the basic information includes manufacturer information, a MUD file server address, a file validity time, and the like.

Step 203. The network management device generates a policy based on the content that is of the at least one field and that is obtained through parsing, where the policy is used to control a network service of the Internet of things terminal, to implement a requirement described in the content of the at least one field.

The content that is of the at least one field included in the MUD file and that is obtained by the network management device through parsing is used to describe the requirement of the Internet of things terminal. The network management device can generate a corresponding policy based on the requirement of the Internet of things terminal, to meet a service requirement of the Internet of things terminal.

For example, if content of the isolated field in the MUD file is True, the network management device creates a virtual private network (VPN) for the Internet of things terminal, and then adds an access port of the Internet of things terminal to the VPN. If content of the Bandwidth field in the MUD file is 3 Mbps (megabit per second), the network management device constructs a bandwidth of 3 megabits for the Internet of things terminal. If content of the UCL-Group field in the MUD file is a user group, the network management device adds the Internet of things terminal to a corresponding user group. If content of the UCL-Group field in the MUD file is a security group, the network management device adds the Internet of things terminal to a corresponding security group.

Optionally, the network management device sends the policy to the access device of the Internet of things terminal. The access device performs corresponding network configuration (including but not limited to interface configuration, protocol configuration, and service configuration) based on the policy.

After completing the corresponding network configuration, the access device notifies the Internet of things terminal that authentication succeeds. Then, the access device can control, based on the network configuration, the network service of the Internet of things terminal that has accessed the campus network, to meet the service requirement of the Internet of things terminal.

In this embodiment, after receiving the URL sent by the Internet of things terminal in the authentication process, the network management device obtains the MUD file based on the URL. Next, the network management device synchronizes information with the Internet of things terminal in at least one of a network security isolation dimension, a network quality assurance dimension, or a network access permission dimension based on the MUD file. Then, the network management device generates, based on the content of the MUD file, the policy that is used to control the network service of the Internet of things terminal. In this way, deployment of the Internet of things terminal in terms of at least one of security isolation, quality assurance, and access permission can be automatically completed, so that enterprise operating costs are reduced.

Figure 4:
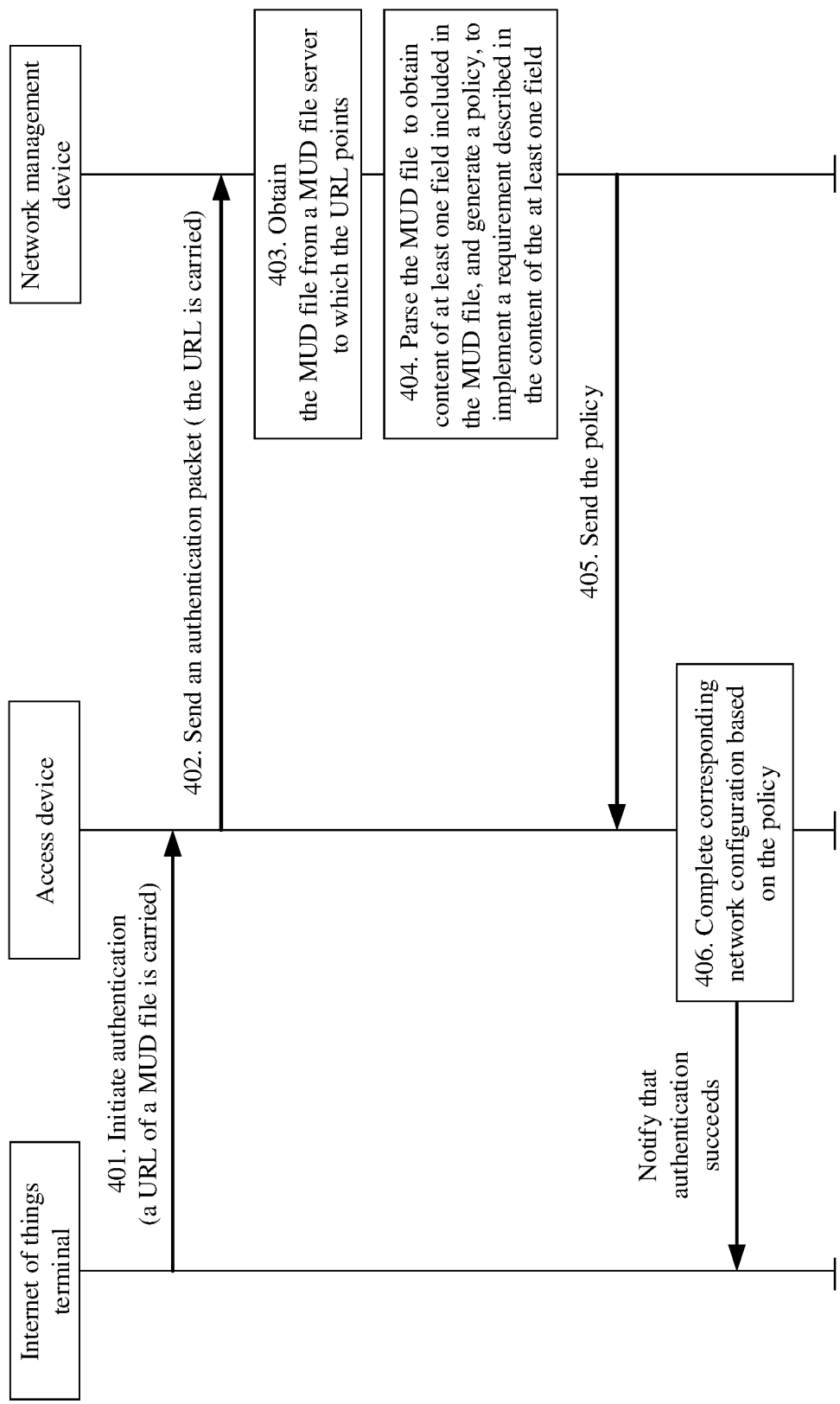
FIG. 4 is a flowchart of another method for controlling a network service of an Internet of things terminal according to an embodiment of this application.

For ease of understanding, with reference to FIG. 4, the foregoing method for controlling a network service of an Internet of things terminal is described by using an example. As shown in FIG. 4, the method includes the following steps 401 to 407.

Step 401: An Internet of things terminal initiates authentication to an access device.

Optionally, authentication initiated by the Internet of things terminal is 802.1X authentication, MAC authentication, portal authentication, or the like. Different protocol packets are used in all types of authentication. For example, an EAP packet is used in 802.1X authentication, and a DHCP packet is used in MAC authentication. In the process in which the Internet of things terminal initiates authentication to the access device, a protocol packet sent by the Internet of things terminal to the access device carries a URL of a MUD file.

Step 402: The access device parses out the URL from the protocol packet sent by the Internet of things terminal, includes the URL into an authentication packet, and sends the authentication packet to a network management device.

Step 403: After receiving the authentication packet sent by the access device, the network management device obtains the MUD file from a MUD file server to which the URL points.

The MUD file is defined by a manufacturer of the Internet of things terminal based on a requirement (a security isolation requirement, a quality assurance requirement, an access permission requirement, or the like) of the Internet of things terminal, and is stored by the manufacturer in the MUD file server.

Step 404: The network management device parses the MUD file to obtain content of at least one field included in the MUD file, and generates a policy, to implement a requirement described in the content of the at least one field.

The content of the at least one field included in the MUD file is used to describe the security isolation requirement, the quality assurance requirement, the access permission requirement, and the like. For example, the content of the at least one field included in the MUD file includes a bandwidth limitation, a delay (Timedelay) limitation, an isolation requirement, and the like.

Step 405: The network management device sends the policy to the access device.

Step 406: After completing a corresponding network configuration based on the policy, the access device notifies the Internet of things terminal that authentication succeeds, so that a network service is normally run.

Figure 5:
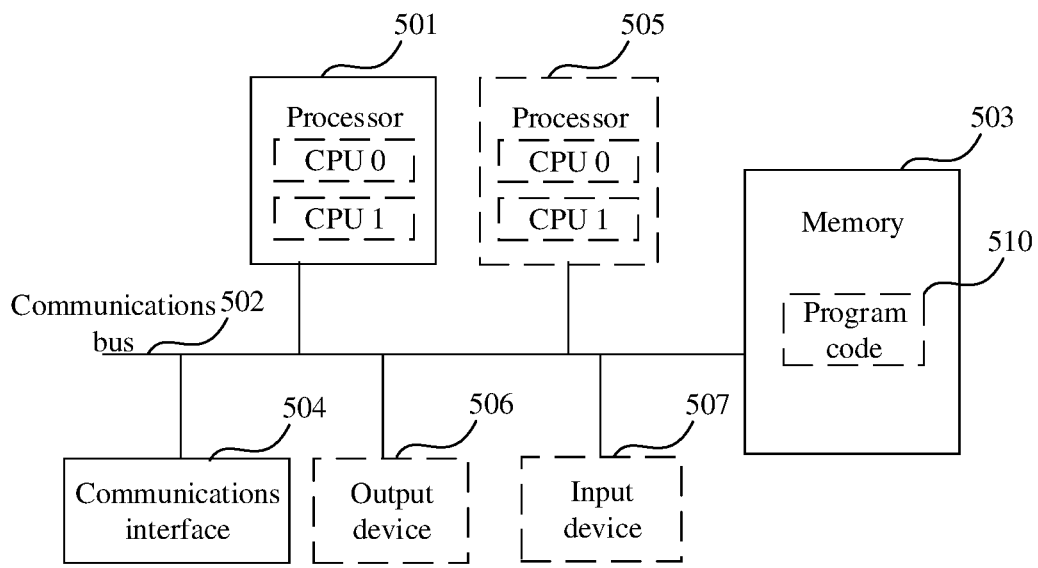
FIG. 5 is a schematic diagram of a structure of a computer device according to an embodiment of this application.

FIG. 5 is a schematic diagram of a structure of a computer device according to an embodiment of this application. Optionally, the computer device is the network management device 103 shown in FIG. 1. Refer to FIG. 5. The computer device includes at least one processor 501, a communications bus 502, a memory 503, and at least one communications interface 504.

Optionally, the processor 501 is a microprocessor (including a central processing unit (CPU) and the like), an application-specific integrated circuit (ASIC), or one or more integrated circuits for controlling program execution of solutions of this application.

The communications bus 502 may include a path, used to transmit information between the foregoing components.

Optionally, the memory 503 is a read-only memory (ROM), a random access memory (RAM), an electrically erasable programmable read-only memory (EEPROM), an optical disc (including a compact disc read-only memory (CD-ROM), a laser disc, a digital versatile disc, a Blue-ray disc, and the like), a magnetic disk storage medium or another magnetic storage device, or any other medium that can be used to carry or store desired program code in a form of an instruction or a data structure and that can be accessed by a computer. However, the memory is not limited thereto. Optionally, the memory 503 exists independently, and is connected to the processor 501 by using the communications bus 502. Alternatively, the memory 503 is integrated with the processor 501.

The communications interface 504 is any apparatus such as a transceiver, and is configured to communicate with another device or a communications network such as the Ethernet, a radio access network (RAN), or a wireless local area network (WLAN).

In a specific implementation, in an embodiment, the processor 501 includes one or more CPUs, for example, a CPU 0 and a CPU 1 shown in FIG. 5.

In a specific implementation, in an embodiment, the computer device includes a plurality of processors, for example, the processor 501 and a processor 505 shown in FIG. 5. Optionally, each of the processors is a single core processor or a multi-core processor. Optionally, the processor herein is one or more devices, circuits, and/or processing cores configured to process data (for example, computer program instructions).

In a specific implementation, in an embodiment, the computer device further includes an output device 506 and an input device 507. The output device 506 communicates with the processor 501, and can display information in a plurality of manners. For example, the output device 506 is a liquid crystal display (LCD), an LED display device, a cathode-ray tube (CRT) display device, or a projector. The input device 507 communicates with the processor 501, and can receive an input of a user in a plurality of manners. For example, the input device 507 is a mouse, a keyboard, a touchscreen device, or a sensing device.

Optionally, the foregoing computer device is a general-purpose computer device or a dedicated computer device. In a specific implementation, the computer device is a desktop computer, a portable computer, a network server, a palmtop computer, a mobile phone, a tablet computer, a wireless terminal device, a communication device, or an embedded device. A type of the computer device is not limited in this embodiment of this application.

The memory 503 is configured to store program code 510 for executing the solutions of this application, and the processor 501 is configured to execute the program code 510 stored in the memory 503. The computer device implements, by using the processor 501 and the program code 510 in the memory 503, the method for controlling a network service of an Internet of things terminal provided in the foregoing embodiment in FIG. 2.

Figure 6:
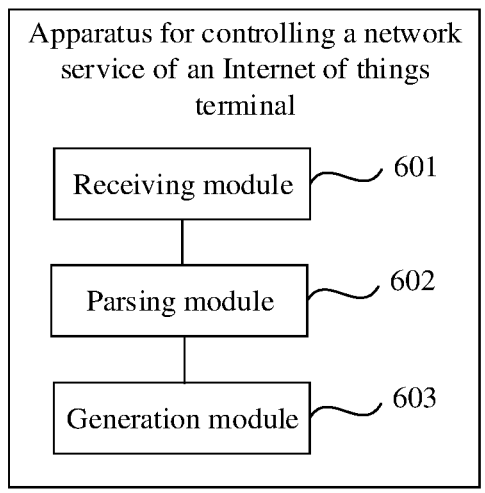
FIG. 6 is a schematic diagram of a structure of an apparatus for controlling a network service of an Internet of things terminal according to an embodiment of this application.

FIG. 6 is a schematic diagram of a structure of an apparatus for controlling a network service of an Internet of things terminal according to an embodiment of this application. Optionally, the apparatus is implemented as a part or all of a computer device by using software, hardware, or a combination of both. Optionally, the computer device is the computer device shown in FIG. 5.

As shown in FIG. 6, the apparatus includes a receiving module 601, a parsing module 602, and a generation module 603.

The receiving module 601 is configured to perform step 201 in the foregoing embodiment in FIG. 2.

The parsing module 602 is configured to perform step 202 in the foregoing embodiment in FIG. 2.

The generation module 603 is configured to perform step 203 in the foregoing embodiment in FIG. 2.

Optionally, the first-type field includes at least one of: a user control list group field or an isolated field, the user control list group field is used to indicate a user group or a security group, and the isolated field is used to indicate whether isolation is required.

Optionally, the second-type field includes at least one of: a bandwidth field, a delay field, a jitter field, or a priority field. The bandwidth field is used to indicate an uplink/downlink bandwidth requirement. The delay field is used to indicate an uplink/downlink delay requirement. The jitter field is used to indicate an uplink/downlink latency jitter requirement. The priority field is used to indicate at least one of an Internet protocol (IP) layer priority or an Ethernet layer priority.

Optionally, the MUD file further includes a third-type field, and the third-type field is used to describe an access permission requirement.

Optionally, the apparatus further includes:

a sending module, configured to send the policy to an access device of the Internet of things terminal.

In this embodiment of this application, after receiving the URL sent by the Internet of things terminal in the authentication process, the apparatus obtains the MUD file based on the URL. Next, the apparatus synchronizes information with the Internet of things terminal in at least one of a network security isolation dimension or a network quality assurance dimension based on the MUD file. Then, the network management device generates, based on the content of the MUD file, the policy that is used to control the network service of the Internet of things terminal. In this way, deployment of the Internet of things terminal in terms of at least one of security isolation and quality assurance can be automatically completed, so that enterprise operating costs are reduced.

It should be noted that, when the apparatus for controlling a network service of an Internet of things terminal provided in the foregoing embodiment controls the network service of the Internet of things terminal, division of the foregoing functional modules is only used as an example for description. In actual application, the foregoing functions can be allocated to and completed by different functional modules based on a requirement. In other words, an internal structure of the apparatus is divided into different functional modules, to complete all or a part of the functions described above. In addition, the apparatus for controlling a network service of an Internet of things terminal provided in the foregoing embodiment and the embodiment of the method for controlling a network service of an Internet of things terminal belong to a same concept. For a specific implementation process thereof, refer to the method embodiment.

In some embodiments, a computer-readable storage medium that stores data is provided. The data includes a data structure. The data structure includes at least one of: a first-type field or a second-type field, the first-type field is used to describe a security isolation requirement, the second-type field is used to describe a quality assurance requirement, and the first-type field and the second-type field each include at least one field. The first-type field and the second-type field have been explained in detail in the foregoing embodiments.

In some embodiments, refer to FIG. 3. A data structure of a MUD file is provided. The MUD file is used to describe a network requirement of an Internet of things terminal. The data structure includes at least one of: a first-type field or a second-type field, the first-type field is used to describe a security isolation requirement, the second-type field is used to describe a quality assurance requirement, and the first-type field and the second-type field each include at least one field. The first-type field and the second-type field have been explained in detail in the foregoing embodiments.

Optionally, all or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedures or functions according to the embodiments of this application are all or partially generated. Optionally, the computer is a general-purpose computer, a dedicated computer, a computer network, or another programmable device. Optionally, the computer instructions are stored in a computer-readable storage medium or transmitted from a computer-readable storage medium to another computer-readable storage medium. For example, the computer instructions are transmitted from a website, computer, server, or data center to another website, computer, server, or data center in a wired (for example, a coaxial cable, an optical fiber, or a digital subscriber line (DSL)) or wireless (for example, infrared, radio, or microwave) manner. Optionally, the computer-readable storage medium is any usable medium accessible by a computer, or a data storage device, such as a server or a data center, integrating one or more usable media. Optionally, the usable medium is a magnetic medium (for example, a floppy disk, a hard disk, and a magnetic tape), an optical medium (for example, a digital versatile disc), a semiconductor medium (for example, a solid state drive (SSD)), or the like.

The foregoing descriptions are merely the embodiments of this application, but are not intended to limit this application. Any modification, equivalent replacement, improvement, or the like made within the scope of this application should fall within the protection scope of this application.

What is claimed is:

1. A method for generating a policy to be used for controlling a network service of an Internet of things terminal, comprising:

receiving, by a network management device, a uniform resource locator (URL) sent by an Internet of things terminal in an authentication process;

obtaining, by the network management device, a manufacturer usage descriptions (MUD) file based on the URL, and parsing the MUD file to obtain content of at least one field comprised in the MUD file, wherein the MUD file comprises a first-type field, the first-type field describes a security isolation requirement of the Internet of things terminal, and the first-type field comprises an isolated field indicating whether isolation is required among a plurality of Internet of things terminals including the Internet of things terminal; and generating, by the network management device, a policy based on the content of the at least one field, wherein the content of the at least one field is obtained through parsing, and the policy controls a network service of the Internet of things terminal, to implement a requirement described in the content of the at least one field.

2. The method according to claim 1, wherein the first-type field further comprises a user control list group field indicating a user group or a security group.

3. The method according to claim 1, wherein the MUD file further comprises a second-type field including at least one of: a bandwidth field, a delay field, a jitter field, or a priority field, the bandwidth field indicates an uplink/downlink bandwidth requirement, the delay field indicates an uplink/downlink delay requirement, the jitter field indicates an uplink/downlink latency jitter requirement, and the priority field indicates one or more of an Internet protocol (IP) layer priority and an Ethernet layer priority.

4. The method according to claim 1, wherein the MUD file further comprises a third-type field describing an access permission requirement.

5. The method according to claim 1, wherein after generating the policy controlling the network service of the Internet of things terminal, the method further comprises:
sending, by the network management device, the policy to an access device of the Internet of things terminal.

6. The method according to claim 2, wherein the isolated field indicates whether the user group or the security group indicated by the user control list group field is an interworking group or an isolated group.

7. The method according to claim 6, wherein, when the isolated field indicates that isolation is not required, the user group or the security group indicated by the user control list group field is an interworking group in which Internet of things terminals in the user group or the security group can communicate with each other.

8. The method according to claim 6, wherein, when the isolated field indicates that isolation is required, the user group or the security group indicated by the user control list group field is an isolated group in which Internet of things terminals in the user group or the security group cannot communicate with each other.

9. An apparatus for generating a policy to be used for controlling a network service of an Internet of things terminal, applied to a network management device, wherein the apparatus comprises:
a receiver, configured to receive a uniform resource locator (URL) sent by an Internet of things terminal in an authentication process;
a parser, configured to: obtain a manufacturer usage descriptions (MUD) file based on the URL, and parse the MUD file to obtain content of at least one field comprised in the MUD file, wherein the MUD file comprises a first-type field, the first-type field describes a security isolation requirement of the Internet of things terminal, and the first-type field comprises an isolated field indicating whether isolation is required among a plurality of Internet of things terminals including the Internet of things terminal; and
a generator, configured to generate a policy based on the content of the at least one field, wherein the content of the at least one field is obtained through parsing, and the policy controls a network service of the Internet of things terminal, to implement a requirement described in the content of the at least one field.

10. The apparatus according to claim 9, wherein the first-type field comprises at least one of: a user control list group field or an isolated field, the user control list group field indicates a user group or a security group, and the isolated field indicates whether isolation is required.

11. The apparatus according to claim 9, wherein the MUD file further comprises a second-type field including at least one of: a bandwidth field, a delay field, a jitter field, or a priority field, the bandwidth field indicates an uplink/downlink bandwidth requirement, the delay field indicates an uplink/downlink delay requirement, the jitter field indicates an uplink/downlink latency jitter requirement, and the priority field indicates at least one of an Internet protocol (IP) layer priority or an Ethernet layer priority.

12. The apparatus according to claim 9, wherein the MUD file further comprises a third-type field describing an access permission requirement.

13. The apparatus according to claim 9, further comprising:
a transmitter, configured to send the policy to an access device of the Internet of things terminal.

14. A non-transitory, computer-readable storage medium, wherein the computer-readable storage medium stores instructions that, when executed by a computer, enable the computer to perform operations comprising:
receiving a uniform resource locator (URL) sent by an Internet of things terminal in an authentication process;
obtaining a manufacturer usage descriptions (MUD) file based on the URL, and parsing the MUD file to obtain content of at least one field comprised in the MUD file, wherein the MUD file comprises a first-type field, the first-type field describes a security isolation requirement of the Internet of things terminal, and the first-type field comprises an isolated field indicating whether isolation is required among a plurality of Internet of things terminals including the Internet of things terminal; and
generating a policy based on the content of the at least one field, wherein the content of the at least one field is obtained through parsing, and the policy controls a network service of the Internet of things terminal, to implement a requirement described in the content of the at least one field.

15. The non-transitory, computer-readable storage medium according to claim 14, wherein the first-type field comprises at least one of: a user control list group field or an isolated field, the user control list group field indicates a user group or a security group, and the isolated field indicates whether isolation is required.

16. The non-transitory, computer-readable storage medium according to claim 14, wherein the MUD file further comprises a second-type field including at least one of: a bandwidth field, a delay field, a jitter field, or a priority field, the bandwidth field indicates an uplink/downlink bandwidth requirement, the delay field indicates an uplink/downlink delay requirement, the jitter field indicates an uplink/downlink latency jitter requirement, and the priority field indicates one or more of an Internet protocol (IP) layer priority and an Ethernet layer priority.

17. The non-transitory, computer-readable storage medium according to claim 14, wherein the MUD file further comprises a third-type field describing an access permission requirement.

18. The non-transitory, computer-readable storage medium according to claim 14, wherein after generating the policy controlling the network service of the Internet of things terminal, the operations further comprise:

sending the policy to an access device of the Internet of things terminal.

\* \* \* \* \*

UNITED STATES PATENT AND TRADEMARK OFFICE
CERTIFICATE OF CORRECTION

PATENT NO. : 12,238,142 B2
APPLICATION NO. : 17/883800
DATED : February 25, 2025
INVENTOR(S) : Yinxi Zhang et al.

Page 1 of 1

It is certified that error appears in the above-identified patent and that said Letters Patent is hereby corrected as shown below:

In the Specification

Column 4, Line 66, change "'I'" to --"/"--.

Signed and Sealed this
Twenty-fifth Day of March, 2025

Coke Morgan Stewart
*Acting Director of the United States Patent and Trademark Office*